United States Patent Office 3,023,218
Patented Feb. 27, 1962

3,023,218
WATER-SOLUBLE DYESTUFFS OF THE
AZAPORPHIN SERIES
Arnold Tartter, Lambsheim, Pfalz, Germany, assignor to Badische Anilin- & Soda-Fabrik Aktiengesellschaft, Ludwigshafen (Rhine), Germany
No Drawing. Filed Mar. 9, 1959, Ser. No. 797,861
4 Claims. (Cl. 260—314.5)

This invention relates to water-soluble dyestuffs of the azaporphin series which are obtained by the action of sulfonating agents on azaporphins containing hydroxyalkylaminomethyl groups or mixtures of the same and to a process for the production of such dyestuffs.

It has heretofore been known that water-insoluble dyestuffs of the azaporphin series can be converted with sulfonating agents into water-soluble azaporphin sulfonic acids. The latter may be used for example for dyeing textiles. The dyeings thus obtained have a good brilliance and excellent fastness to light but only a moderate fastness to washing.

It was therefore desirable to find water-soluble dyestuffs of the azaporphin series with which textile dyeings are obtained which not only have the known excellent fastness properties of the azaporphin dyestuffs, but also have good fastness to washing and kierboiling.

I have now found that valuable water-soluble dyestuffs of the azaporphin series of the said kind are obtained by treating azaporphins containing hydroxyalkylaminomethyl groups or mixtures of the same with sulfonating agents.

The materials containing hydroxyalkylaminomethyl groups which are used at the start of the process according to my invention can be derived either from metal-free azaporphins or metal-containing azaporphins, especially from those metal complex compounds which do not release metal in an acid medium, for example the azaporphin complexes of copper, nickel or cobalt. Above all the tetrabenzotetra-azaporphins known by the name phthalocyanines are applicable as initial materials. However mono- and di-azaphthalocyanines or tetrabenzo-mono-, -di- or -tri-azaporphins, and their mixtures, can also be used. The hydroxyalkylaminomethyl compounds can also be derived from mono-, di- or tribenzo-azaporphins, for example dibenzotetramethyl-tetra-aza-nickel porphin, or from tetra-azaporphins and tetrabenzotetra-azaporphins containing phenyl groups, for example octaphenyl-tetra-aza-copper porphin or tetraphenyl copper phthalocyanine or tetranaphtho-tetra-azaporphins.

Azaporphins containing hydroxyalkylaminomethyl groups may readily be prepared for example by reaction of halogen-methylated azaporphins with hydroxyalkylamines; they can also be obtained, however, by the action for example of hydroxyalkyl halides or alkylene oxides on aminomethylazaporphins.

The azaporphins serving as initial materials contain identical or different N-mono- or, advantageously, N,N-di-(hydroxyalkyl)-aminomethyl groups which preferably have linear or branched low molecular alkylene radicals. As low molecular alkylene radicals there may be mentioned alkylene radicals with up to five carbon atoms, which may contain substituents, as for example a hydroxyl group. The N-mono-(hydroxyalkyl)aminomethyl groups contain, attached to the nitrogen atom, a hydrogen atom or lower alkyl or aryl radicals, for example a methyl or a phenyl radical. N-mono- and N,N-di-(hydroxyalkyl)- aminomethyl groups of the said kind are for example the following groups:

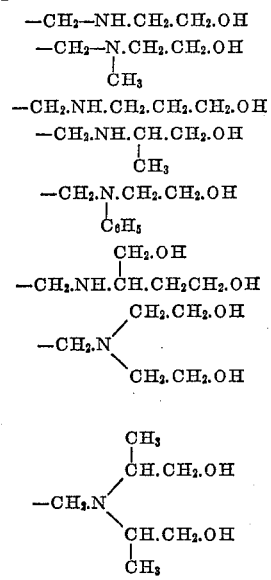

and

The new water-soluble dyestuffs of the azaporphin series can be obtained in a simple way by treating azaporphins containing hydroxyalkylaminomethyl groups or mixtures of the same with sulfonating agents, for example concentrated sulfuric acid, sulfuric acid monohydrate, oleum with up to 65%, advantageously up to 10%, sulfuric acid anhydride content, or chlorsulfonic acid. The reaction can be carried out in inert solvents, for example in chlorinated aromatic hydrocarbons, or advantageously in an excess of the sulfonating agent. For neutralization use is made of bases, such as dilute alkalies, ammonia, low-boiling amines or hydroxyalkylamines.

The production of the new dyestuffs needs equal to ten times the amounts by weight of sulfonating agents. If the sulfonating agent is used at the same time as a solvent, it is preferably used in such an amount that the azaporphin derivative to be reacted is completely dissolved therein.

The reaction of the tetrazaporphins containing hydroxyalkylaminomethyl groups usually takes place at temperatures between —10° and +60° C. It is advantageous to choose temperatures between +10° and +30° C. In individual cases, however, it may be necessary to work at substantially higher temperatures, say at temperatures up to 150° C.

Those water-soluble dyestuffs of the azaporphin series are of particular interest in large-scale dyeing which are derived from azaporphins containing from twice to four times, advantageously from three to four times, a N,N-dialkylaminomethyl group in which at least one alkyl group carries a hydroxyl group, the hydroxyl group and the nitrogen atom being on vicinal carbon atoms of the alkylene radical, in particular a N,N-di-(hydroxyethyl)-aminomethyl group, and mixtures of the same.

The new dyestuffs obtainable by the method according to my invention cannot be defined by way of a structural formula. Nor can they be otherwise defined by their constitution or composition. They can therefore only be described by the manner of their manufacture.

The water-soluble dyestuffs of the azaporphin series obtainable according to my invention yield textile dyeings which, in addition to the known excellent fastness properties of the azaporphin dyestuffs, have an excellent fastness to washing and kierboiling.

Structures, such as flocks, threads, woven and knitted fabrics of native or regenerated cellulose, such as cotton, linen, hemp, viscose or staple fiber can be dyed, padded or printed in alkaline medium, for example with the addition of alkaline reagents, for example sodium hydroxide, potassium hydroxide, sodium carbonate, potassium carbonate or sodium bicarbonate.

The best results in respect of fastness properties and color strength are obtained by a thermal treatment which may either be carried out in the dyebath or padding bath or after the dyeing or padding process. By thermal treatment there is to be understood for example the heating of the dyebath or padding bath to temperatures above 60° C. or the steaming of the dyed or padded materials or their treatment with hot air. The fixation of the dyestuffs thereby takes place at temperatures of 60° to 200° C., preferably at 95° to 160° C.

It is preferable to add electrolytes, such as sodium chloride or sodium sulfate, to the dyebath or padding bath. It is also possible, if necessary, to work in two baths, for example by padding in a bath containing the dyestuff, possibly with an addition of an electrolyte, effecting an intermediate drying and then padding again with a bath which contains the alkaline reagent and an electrolyte, whereupon the material is dried and subjected to a thermal treatment.

On printing, the dyestuff is applied to the fiber advantageously with a thickening agent, such as sodium alginate or tragacanth, desirably with one of the usual printing auxiliaries and an alkaline reagent, dried and steamed. The fabric may also be printed with the dyestuff together with a thickening agent and the usual printing auxiliaries, dried, passed through a bath charged with an alkaline reagent, dried and steamed.

The dyeings and prints thus obtained have very good fastness to wet treatment, rubbing and light.

The following examples will further illustrate this invention but the invention is not restricted to these examples. The parts and percentages specified in the examples are parts and percentages by weight.

*Example 1*

50 parts of tetrakis-(N,N-di-(hydroxyethyl)-aminomethyl)-copper phthalocyanine are introduced in small portions while stirring into 400 parts of sulfuric acid monohydrate at room temperature and stirred until the dyestuff has completely gone into solution and a sample is clearly soluble in aqueous ammonia. The reaction mixture is then poured onto ice, neutralized with aqueous ammonia, dilute caustic soda solution or soda solution, salted out and filtered off by suction. The moisture is expelled from the filtered material by washing with methanol or it is dried at moderate temperature and there are thus obtained 140 parts of a dyestuff readily soluble in water with a turquoise blue color.

By using, instead of the copper compound, the corresponding complex of nickel or iron or tetrakis-(N,N-di-(hydroxyethyl)-aminomethyl)-tetrachloro copper phthalocyanine, dyestuffs are obtained with a turquoise blue shade modulated towards green.

*Example 2*

10 parts of tris-(N,N-di-(hydroxyisopropyl)-aminomethyl)-copper phthalocyanine are stirred into 100 parts of 100% sulfuric acid while cooling with ice-water. After a few hours the acid solution is allowed to flow gradually into a mixture of ammoniacal water and ice, and the dyestuff is salted out, filtered off by suction and dried in a vacuum drying cabinet at 40° to 50° C. There are thus obtained 25 parts of a dyestuff which contains salt and which is soluble in water with a blue color.

By using, instead of the copper phthalocyanine derivative, the corresponding compound of tetraphenyl copper phthalocyanine, a green water-soluble dyestuff is obtained.

*Example 3*

18 parts of a mixture of tris- and tetrakis-(N-methyl-N-hydroxyethylaminomethyl)-aluminum phthalocyanine are introduced while cooling and stirring into 150 parts of chlorsulfonic acid. After stirring for a long time, the acid solution is allowed to flow in a narrow stream into ice-water and neutralized with aqueous ammonia. After salting out and filtering by suction, the dyestuff is dried at moderate temperature. The color of its solution in water is substantially greener than that of the dyestuff described in Example 2. A still greener dyestuff is obtained by sulfonating the corresponding derivative of tetranaphthotetra-aza-nickel porphin.

*Example 4*

20 parts of tetrakis-(N,N-di-(hydroxyethyl)-aminomethyl)-copper phthalocyanine are finely dispersed in 200 parts of ortho-dichlorbenzene and stirred with 30 parts of 100% sulfuric acid. After about 8 hours, ammonia gas is led in while cooling or powdered ammonium carbonate is added for neutralization. The precipitated dyestuff is then filtered off by suction and washed with methanol. It corresponds in its properties to the product obtained according to Example 1.

It is also possible to start from a mixture of the corresponding tris- and tetrakis- derivatives instead of the tetrakis- compound and a dyestuff with similar properties is thereby obtained. If the corresponding tris- or bis- derivative is sulfonated instead of the tetrakis- compound, dyestuffs are obtained with a somewhat more reddish turquoise blue shade. The shade of the dyestuff which is formed by sulfonation of a mixture of bis-(N,N-di-(hydroxyethyl)-aminomethyl)-diaza- and tris-(N,N-di-(hydroxyethyl)-aminomethyl)-monoazo-copper phthalocyanines is still more distinctly modulated towards red.

*Example 5*

10 parts of tris-(1,4-dihydroxybutyl-2-aminomethyl)-copper phthalocyanine and 100 parts of sulfuric acid monohydrate which contain 2 parts of sulfur trioxide are shaken for a short time until complete solution has taken place. It is then worked up in the way described in the preceding examples and the dyestuff dried at about 45° C. It dissolves in water with a blue color.

Similar dyestuffs are formed by sulfonation of tetrakis-(N-hydroxyethyl- or -hydroxypropyl- or -hydroxyisopropyl- or -phenyl - N - hydroxyethyl-aminomethyl) - copper phthalocyanine.

*Example 6*

Staple fiber fabric is printed with a paste consisting of 30 parts of the sulfonation product from tetrakis-(N,N-di-(hydroxyethyl)-aminomethyl)-copper phthalocyanine (prepared according to the first paragraph of Example 1 or the first paragraph of Example 4), 150 parts of urea, 375 parts of water, 420 parts of alginate thickening and 25 parts of sodium carbonate, dried and steamed for 8 minutes at 103° C. The fabric is then soaped well. Brilliant turquoise blue prints are obtained with very good wet fastness properties, very good fastness to rubbing and excellent fastness to light.

I claim:

1. A water-soluble dyestuff of the azaporphin series which has been obtained by reacting 1 to 10 parts by weight of a sulfonating agent selected from the class consisting of sulfuric acid, oleum with up to 65% sulfuric acid anhydride and chlorosulfonic acid, with 1 part by weight of an azaporphin in complex combination with a metal selected from the group consisting of copper, iron, cobalt, nickel and aluminum, said azaporphin being selected from the class consisting of phthalocyanine and phenyl substituted tetrabenzo tetraazaporphin, and said azaporphin bearing from 2 to 4 substituents of the formula

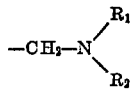

wherein $R_1$ is hydroxy lower alkyl such that the nitrogen atom and hydroxy group are located on vicinal carbon atoms and $R_2$ is a member selected from the group consisting of hydrogen, lower alkyl, hydroxy lower alkyl and phenyl, at a temperature between $-10°$ and $+60°$ C.

2. The dyestuff obtained by a process as described in claim 1 wherein the azaporphin is tetrakis-(N,N-di-(hydroxyethyl)-aminomethyl)-copper phthalocyanine.

3. The dyestuff obtained by a process as described in claim 1 wherein the azaporphin is tris-(N,N-di-(hydroxyethyl)-aminomethyl)-copper phthalocyanine.

4. The dyestuff obtained by a process as described in claim 1 wherein the azaporphin is tris-(N,N-di-(hydroxyisopropyl)-aminomethyl)-copper phthalocyanine.

References Cited in the file of this patent

UNITED STATES PATENTS

| | | |
|---|---|---|
| 2,099,689 | Holzach et al. | Nov. 23, 1937 |
| 2,107,898 | McNally et al. | Feb. 8, 1938 |
| 2,475,228 | Felix et al. | July 5, 1949 |
| 2,795,584 | Martin | June 11, 1957 |